US008478289B1

(12) United States Patent
Lookingbill et al.

(10) Patent No.: US 8,478,289 B1
(45) Date of Patent: Jul. 2, 2013

(54) PREDICTING GEOGRAPHIC POPULATION DENSITY

(75) Inventors: Andrew Lookingbill, Palo Alto, CA (US); Sebastian Thrun, Stanford, CA (US)

(73) Assignee: Google Inc., Mountain View, CA (US)

( * ) Notice: Subject to any disclaimer, the term of this patent is extended or adjusted under 35 U.S.C. 154(b) by 383 days.

(21) Appl. No.: 12/791,368

(22) Filed: Jun. 1, 2010

(51) Int. Cl.
*H04W 24/00* (2009.01)

(52) U.S. Cl.
USPC ............. 455/456.1; 455/446; 455/414.1; 455/2.01

(58) Field of Classification Search
USPC 455/414.1, 446, 456.1, 456.3, 2.01; 702/127, 702/179; 705/14.4–14.67
See application file for complete search history.

(56) References Cited

U.S. PATENT DOCUMENTS

| | | | |
|---|---|---|---|
| 6,418,425 B1 * | 7/2002 | Maeda et al. | 706/47 |
| 7,516,010 B1 | 4/2009 | Kaplan et al. | |
| 2002/0161520 A1 | 10/2002 | Dutta et al. | |
| 2003/0014213 A1 * | 1/2003 | Yokota | 702/150 |
| 2003/0204312 A1 * | 10/2003 | Woronow et al. | 702/14 |
| 2007/0042770 A1 * | 2/2007 | Yasui et al. | 455/428 |
| 2008/0048885 A1 | 2/2008 | Quinn | |
| 2012/0135746 A1 | 5/2012 | Mohlig et al. | |

OTHER PUBLICATIONS

Markov Random Fields and Their Applications by Kindermann et al., dated 1980.*
Understanding spatial connectivity of individuals with non-uniform population density by Wang et al., dated Aug. 2009.*

(Continued)

*Primary Examiner* — Lester Kincaid
*Assistant Examiner* — Daniel Lai
(74) *Attorney, Agent, or Firm* — Fenwick & West LLP

(57) ABSTRACT

The population density for a geographic area is predicted using a Markov Random Field (MRF) model. A MRF model is defined for estimating a number of mobile devices being used within a geographic area. The MRF model includes a set of rules describing how to use current data describing mobile devices currently observed in the area, and historical data describing mobile devices historically observed in the area to produce the estimate. Values of weight parameters in the MRF model are learned using the historical data. The current and historical data are applied to the MRF model having the learned weight parameters, and cost minimization is used to estimate of the number of mobile devices currently being used within the area. This estimate is used to predict the population density for the area. The predicted population density can then be used to provide location-based services.

20 Claims, 5 Drawing Sheets

OTHER PUBLICATIONS

Caceres, J.P., et al., "Deriving origin-destination data from a mobile phone network," IET Intelligent Transportation Systems, Mar. 2007, vol. 1, No. 1, pp. 15-26.

Diebel, J., et al., "An Application of Markov Random Fields to Range Sensing," NIPS 2005, 8 pages.

Ferris, B., et al., Gaussian Processes for Signal Strength Based Location Estimation, Proc. of Robotics Science and Systems, 2006, 8 pages.

Hightower, J., et al., "Particle Filters for location estimation in ubiquitous computing: A Case study," Lectures Notes in Computer Science, Springer, 2004, 18 pages.

Ratti, C., et al., "Mobile Landscapes: Using location data from cell phones for urban analysis," in Environment and Planning B: Planning and Design, 2006, pp. 727-748, vol. 33.

Reades, F., et al., "Cellular Census: Explorations in Urban Data Collection," IEEE Pervasive Computing, Jul.-Sep. 2007, pp. 10-18.

Shewchuk, J., "An Introduction to the Conjugate Gradient Method Without the Agonizing Pain," Technical Report CMU-CS-TR-94-125, Carnegie Mellon University, 1994, 64 pages.

Westwood Professional Services, Inc., "Mall of America Draft Final Visitor and Parking Study," Apr. 10, 2006, 44 pages.

\* cited by examiner

PREDICTING GEOGRAPHIC POPULATION DENSITY

BACKGROUND

1. Field of Disclosure

This disclosure relates in general to the field of location-based services and in particular to predicting geographic population density to provide and improve such services.

2. Description of the Related Art

Location-based services are growing in popularity. Many modern mobile devices, such as mobile telephones, are equipped with functionality allowing determination of the devices' geographic positions. This positioning information is used, in turn, to provide location-based services such as maps of the geographic areas proximate to the devices.

Geographic population density, defined as the number of people within a geographic area, can be used to enhance location-based services. For example, geographic population density can be used to estimate traffic congestion on roads within an urban area. Likewise, population density can be used to estimate the time required to find a parking space in an urban area.

Accurately determining geographic population density is difficult. Mobile phone usage within the geographic area can serve as a proxy for the number of people in the area. However, mobile phone data are sparse. The data do not indicate the number of people in the area, but rather the number of people using their mobile phones in the area. The mobile phone data are also noisy. A spike in mobile phone usage in a given area might indicate a high population density, or it might merely indicate that a greater-than-average number of people are using their mobile phones for random reasons. The data are also noisy as a result of the localization errors of individual mobile phones.

SUMMARY

The above and other issues are addressed by a method, computer, and computer-readable storage medium storing instructions for predicting geographic population density. Embodiments of the method comprise defining a Markov Random Field (MRF) model for estimating a number of mobile devices used within a geographic area. The method also applies current data describing a number of mobile devices currently observed within the geographic area and historical data describing a number of mobile devices historically observed within the geographic area to the MRF model to produce an estimate of a number of mobile devices currently being used within the geographic area. In addition, the method predicts a population density for the geographic area responsive to the estimated number of mobile devices currently being used within the geographic area and stores the predicted population density for the geographic area in a computer-readable storage medium.

Embodiments of the computer comprise a non-transitory computer-readable storage medium storing executable computer program instructions. The instructions, in turn comprise instructions defining a Markov Random Field (MRF) model for estimating a number of mobile devices used within a geographic area. The instructions further apply current data describing a number of mobile devices currently observed within the geographic area and historical data describing a number of mobile devices historically observed within the geographic area to the MRF model to produce an estimate of a number of mobile devices currently being used within the geographic area. The instructions additionally predict a population density for the geographic area responsive to the estimated number of mobile devices currently being used within the geographic area. The computer additionally comprises a processor for executing the computer program instructions.

Embodiments of the computer-readable storage medium store executable computer program instructions. The instructions, in turn comprise instructions defining a Markov Random Field (MRF) model for estimating a number of mobile devices used within a geographic area. The instructions further apply current data describing a number of mobile devices currently observed within the geographic area and historical data describing a number of mobile devices historically observed within the geographic area to the MRF model to produce an estimate of a number of mobile devices currently being used within the geographic area. The instructions additionally predict a population density for the geographic area responsive to the estimated number of mobile devices currently being used within the geographic area.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
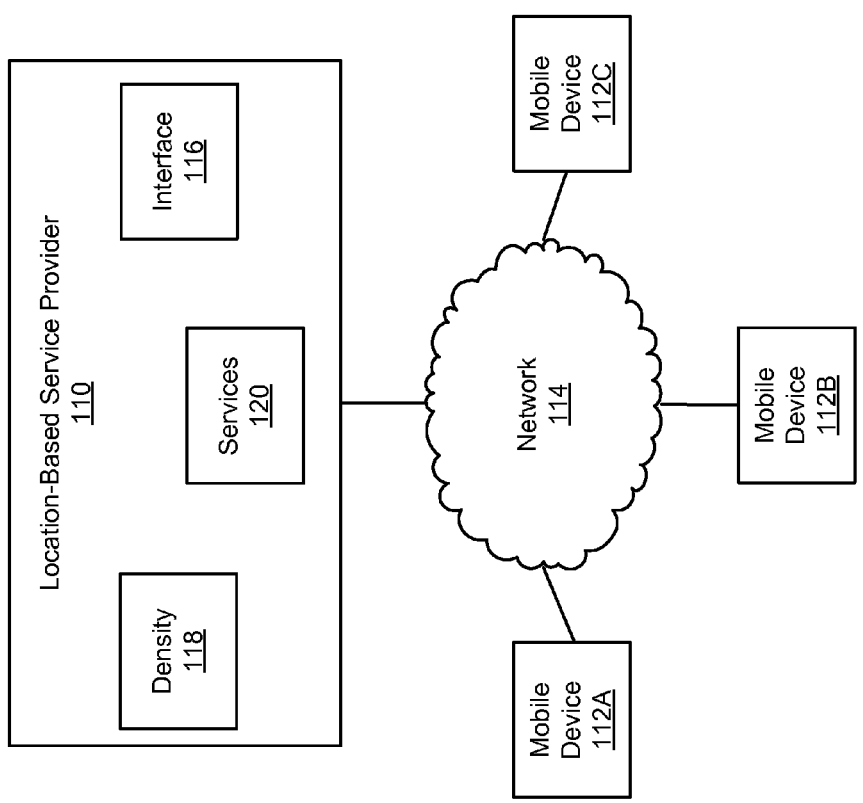
FIG. 1 is a high-level block diagram that illustrates a computing environment for estimating geographic population density according to one embodiment.

FIG. 1 is a high-level block diagram that illustrates a computing environment 100 for estimating geographic population density according to one embodiment. As shown, the computing environment 100 includes a location-based service provider (the "service provider") 110 and multiple mobile devices 112A-C connected through a network 114. Only one service provider 110 and three mobile devices 112 are illustrated in FIG. 1 in order to simplify and clarify the present description. Embodiments can have millions of mobile devices 112 and multiple service providers 110. There can be other entities in the computing environment 100 as well.

The mobile devices 112 are electronic devices that can communicate with the service provider 110 via the network. In one embodiment, the mobile devices 112 include web-browsing functionality allowing the mobile devices 112 to access location-aware services provided by the service provider 110. In addition, the mobile devices 112 can include position-determining functionality, such as Global Positioning System (GPS) receivers. Examples of mobile devices 112 include mobile telephones, portable digital assistants (PDAs), notebook and tablet computers, and automotive GPS receivers. Although this description refers to the devices as "mobile," the devices need not be portable. The phrase "mobile device" can also include a device that is typically stationary, such as a desktop computer.

A mobile device 112 is used by an end-user to request services from the service provider 110. One such service is mapping. The end-user, or an application executing on the mobile device 112, requests map information for the geographic area proximate to the mobile device. In turn, logic within the mobile device 112 determines the current geographic location of the device, and requests a map centered on this location from the service provider 110. The map is then displayed on a display of the mobile device 112 and/or used to provide an auxiliary service.

The service provider 110 is a hardware device and/or software program configured to provide the mobile devices 112 with location-based services. As shown, the service provider 110 includes an interface module 116 for interfacing between the service provider 110 and the mobile devices 112. The interface module 116 receives requests for location-based services and other data from the mobile devices 112 and provides data supporting the services in return. The interface module 116 can include, for example, a web server for receiving and responding to requests received from the mobile devices 112.

The service provider 110 also includes a density module 118 for estimating the number of people in a given geographic area at a given time (the "geographic population density" or just "population density"). In one embodiment, the density module 118 uses the center points of the map request from the mobile devices 112 as indications that the mobile device users are located at those points. In addition, the density module 118 uses a Markov Random Field (MRF) model that incorporates both current and historical data in order to estimate the total number of mobile device users in the area. The MRF model leverages the spatial and temporal consistency of mobile device usage patterns and provides significant accuracy improvements over estimates based solely on instantaneous observations. From the number of mobile device users, the density module 118 predicts the number of people in the geographic area and, hence, the area's population density.

A services module 120 within the service provider 110 provides location-based services to the mobile devices 112, including services that use the population density estimated by the density module 118. For example, the services module 120 can provide overlays to map data that use the population densities of the areas shown in the maps. One such overlay graphically illustrates the population density using a heat map or other technique. Another such overlay graphically illustrates traffic congestion, where the congestion is based in part on the population density. For example, the population density can be used to supplement data from road sensors or provide estimates of congestion in areas where road sensors are non-existent or sparse. The congestion data used in the overlay can be normalized in order to illustrate any spikes or troughs relative to normal congestion in the illustrated area. The services module 120 can also use the population density to provide estimates of the time it takes to find a parking place in a particular geographic area, either through a map overlay or another technique. Other embodiments of the services module 120 use the population density estimate to provide different and/or additional location-based services.

The network 114 enables communications between the service provider 110 and the mobile devices 112. In one embodiment, the network 114 uses standard communications technologies and/or protocols and can include the Internet as well as mobile telephone networks. Thus, the network 114 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 114 can use custom and/or dedicated data communications technologies instead of, or in addition to, the ones described above.

Computer Architecture

Figure 2:
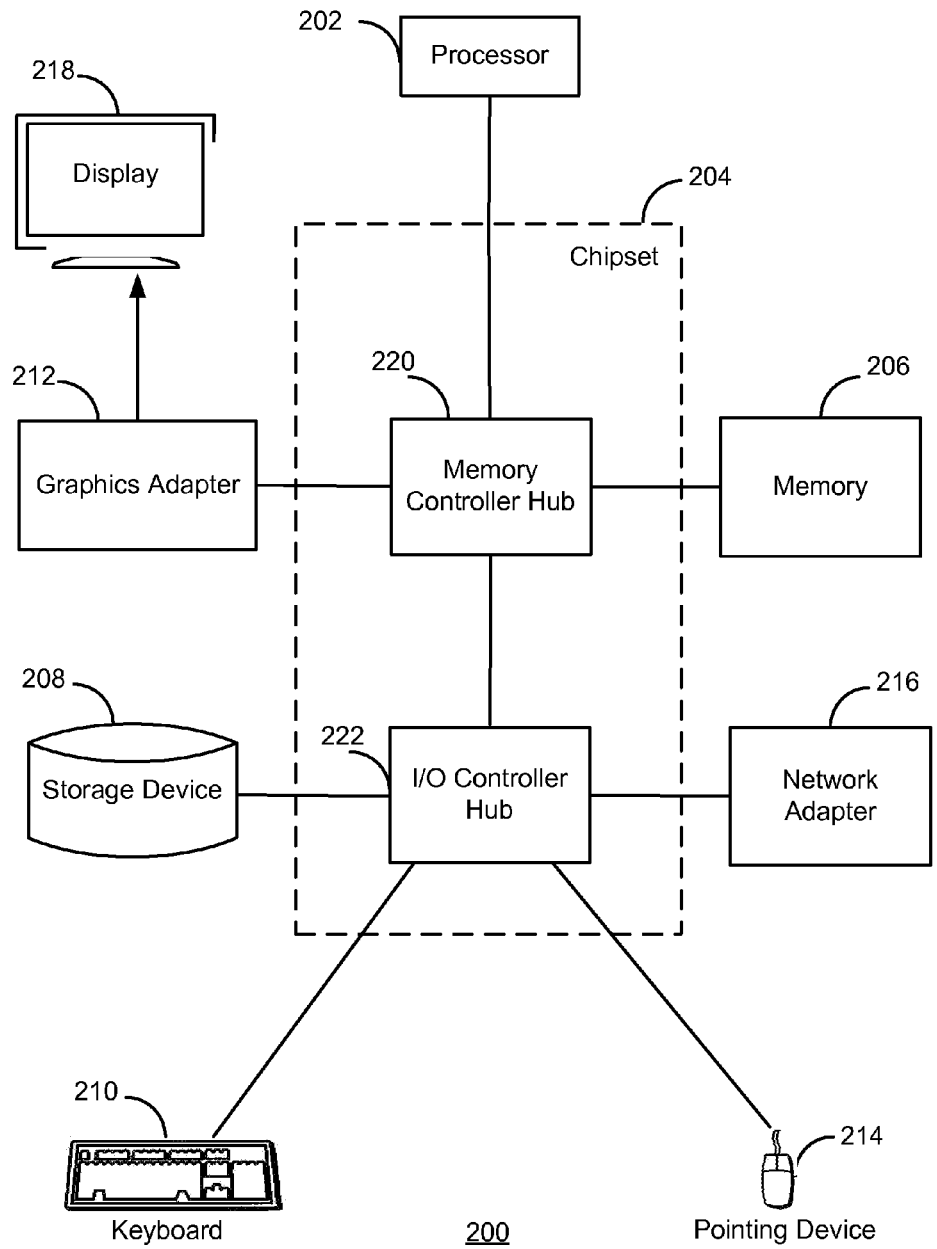
FIG. 2 is a high-level block diagram illustrating a typical computer for use as a service provider or mobile device.

FIG. 2 is a high-level block diagram illustrating a typical computer 200 for use as a service provider 110 or mobile device 112. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer 200 to the network 116.

As is known in the art, a computer 200 can have different and/or other components than those shown in FIG. 2. In addition, the computer 200 can lack certain illustrated components. In one embodiment, a computer 200 acting as the service provider 110 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)). As another example, a mobile device 112 might comprise a Smartphone with limited processing power and a touch screen interface.

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Example Architectural Overview of the Density Module

Figure 3:
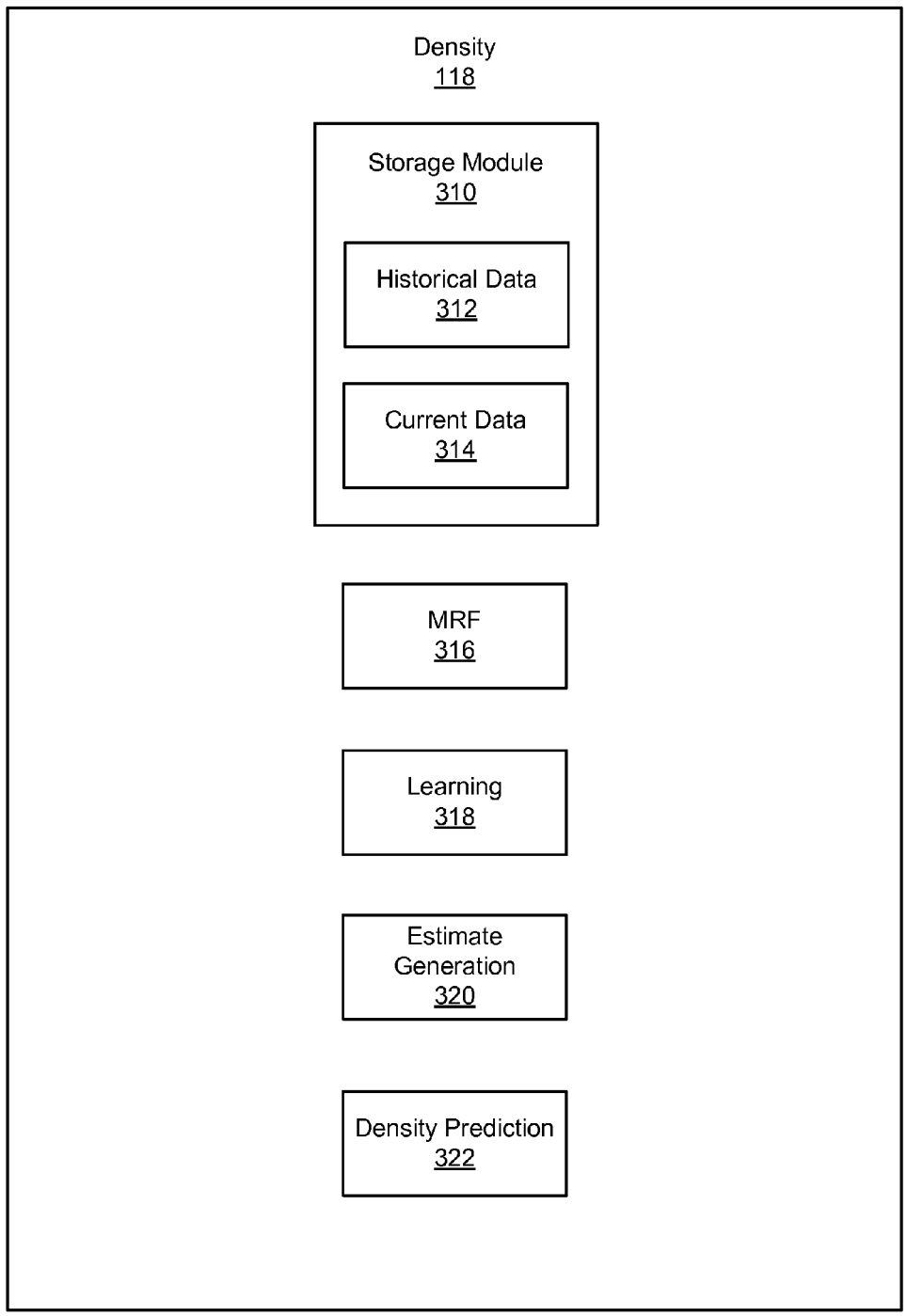
FIG. 3 is a high-level block diagram illustrating a detailed view of modules within the density module according to one embodiment.

FIG. 3 is a high-level block diagram illustrating a detailed view of modules within the density module 118 according to one embodiment. Some embodiments of the density module 118 have different and/or other modules than the ones described herein. Similarly, the functions can be distributed among the modules in accordance with other embodiments in a different manner than is described here. Likewise, the functions can be performed by other entities.

A storage module 310 stores data used by the density module 118. Examples of such data include historical and current mobile device usage data, intermediate data created and used during the population density prediction process, and predicted population densities. The data storage module 310 may include a relational database or another type of database.

As shown in FIG. 3, an embodiment of the storage module 310 stores a dataset 312 of historical data. In one embodiment, the historical data describe data points received from mobile devices 112 within a defined time interval, such as within one year. A data point is an observation that a mobile device 112 was used at a particular geographic location at a particular date and time. Thus, a request for a location-based service received from a mobile device 112 that identifies a location is a data point. In one embodiment, the storage module 310 stores data points corresponding to the center points of map requests received by the service provider over the defined time interval.

In one embodiment, the historical data describe data points for a particular geographic area for which the population density will be predicted. For example, the historical data can describe data points for a particular city such as San Francisco. In addition, the locations of the data points are quantized within the geographic area. The geographic area is divided into a grid, and the locations of the data points are mapped to nodes within the grid. In one embodiment, the grid has 1000 nodes, with each node representing roughly a two-by-two block square of a city. Thus, in one embodiment, the center point of each map request received from a mobile device 112 is mapped to the node in which the center point is located.

Further, in one embodiment the data points within the historical dataset 312 are aggregated by time. For example, the data points can be aggregated into hours. Thus, for a given week, a node of the grid has 168 (24*7) values, with each value representing the number of data points received from that node within an hour of that week.

A current dataset 314 within the storage module 310 stores current data describing data points observed in a current time interval, e.g., a current hour. The current dataset 314 can be populated, for example, by the interface module 116 of the service provider 110 as service requests are received from the mobile devices 112. The data within the current dataset 314 can move to the historical dataset 312 as the data age.

In one embodiment, the data within the current dataset 314 are organized into the same grid and temporal aggregation as the data within the historical dataset 312. Thus, the current data describe the number of data points observed for a particular node of a grid for a geographic area within a current hour. In one embodiment, the data in the current dataset 314, as well as the data in the historical dataset 312, are anonymous so that the mobile devices 112 and end-users cannot be identified.

A MRF module 316 maintains data describing a MRF model that the density module 118 uses to estimate the number of mobile devices used within geographic areas. In one embodiment, the MRF model has state variables x, observations y, and prior (historical) measurements π. The MRF model can be visualized as having the state variables x arranged as nodes in a regular 3-D lattice. A plane of the lattice corresponds to the grid of the geographic area described above; neighboring nodes reflect areas that neighbor other geographical areas in reality. The third dimension in the lattice reflects the influence of time slices immediately preceding and following the time slice for which the population density is being estimated (i.e., the state of the grid in the time slices preceding and following the time slice represented by the current grid).

The state variables x are unobservable and represent the actual number of mobile devices 112 being used in given areas at a given time. The MRF module 316 uses a set of potentials and priors to capture the relationship between the values of x and the neighbors in time and space, as well as the current and historical observations. The potentials and priors are rules about how to use the datasets 312, 314 to produce the estimate.

In one embodiment, a "prior measurement potential" enforces a rule that the current usage estimate of the number of mobile devices 112 being used in a node of the grid should be close to the historical usage for the node. The prior measurement potential is defined as:

$$\Psi = \sum_L k_\pi (x_i - \pi_i)^2 \qquad (1)$$

In equation (1), ψ represents a cost associated with the prior measurement potential. The potential itself is quadratic and captured over a set of indices L, where $k_\pi$ is a weight, $x_i$ represents the unobservable variable for node i (the current number of mobile devices being used in node i), and $\pi_i$ represents the historical measurement for node i (the number of mobile devices historically observed at that node).

In addition, an "observation potential" enforces a rule that the current usage estimate for a node in the grid should be close to the current observed usage for the node. The observation potential is defined as:

$$\Phi = \sum_L k_y (x_i - y_i)^2 \qquad (2)$$

In equation (2), Φ represents a cost associated with the observation potential. This potential is also quadratic and captured over a set of indices L, where $k_y$ is a weight, $x_i$ represents the unobservable variable for node i, and $y_i$ represents the current observed readings for node i (i.e., the number of data points observed for the node in the current period).

A "spatial smoothness prior" enforces a rule that the current usage estimate for a node in the grid should be close to the usage estimates for the node's neighbors in space. There are four neighbors j in the lattice arrangement, corresponding to the four neighbors of a node in the grid. The spatial smoothness prior is defined as:

$$\Omega = \sum_i \sum_{j \in N(i)} k_x (x_i - x_j)^2 \qquad (3)$$

In equation (3), Ω represents a cost associated with the spatial smoothness prior. This prior is quadratic and captured for each node and each node's neighbors. In the equation, $k_x$ is a weight, $x_i$ represents the unobservable variable for node i, and $x_j$ represents the unobservable variable for node i's j spatial neighbors.

A "temporal smoothness prior" enforces a rule that the current usage estimate for a node in the grid should be close to the usage estimates for the node's neighbors in time. There are two time neighbors j in the lattice arrangement, corresponding to the nodes of the time intervals preceding and following the current node i. The temporal smoothness prior is defined as:

$$T = \sum_i \sum_{j \in N(i)} k_\tau (x^i - x^j)^2 \quad (4)$$

In equation (4), T represents a cost associated with the temporal smoothness prior. This prior is quadratic and captured for each node and each node's neighbors. In the equation, $k_\tau$ is a weight, $x^i$ represents the unobservable variable for node i, and $x^j$ represents the unobservable variable for node is j time neighbors.

Each of the equations has a parameter representing the weight that the equation has in the MRF model (i.e., $k_\pi$, $k_y$, $k_x$, $k_\tau$). A learning module 318 uses the historical dataset 312 to learn the values of the weight parameters. In one embodiment, the learning module 318 selects two weeks of historical data from the dataset 312. The two weeks can be selected at random or based on other considerations and need not be temporally adjacent.

To learn the values of the weight parameters, the learning module 318 treats one of the two weeks as the test dataset and treats the other week as the training dataset. The learning module 318 optimizes the MRF model to determine values of the unobservable variables x (the optimization is described in more detail below) and changes the values of the parameters to minimize the root mean squared error (RMSE) between estimated usage produced by the MRF model when using the training dataset as current observations and the test dataset.

Specifically, to learn a weight parameter, the learning module 318 treats the other three parameters as constants (e.g. with values of '1') and changes the value of the parameter being learned until a value is found that minimizes the RMSE. In one embodiment, learning module 318 minimizes the error by performing a hill-climbing optimization. The learning module 318 repeats this process for each of the other three parameters in order to learn the values. Moreover, some embodiments of the learning module 318 repeat this process multiple times using different weeks from the historical dataset 312 to refine the parameter values.

Depending upon the embodiment, the values of the weight parameters can be fixed or can vary based on time. In the embodiment described above, the learning module 318 determines fixed values for the parameters. That is, the parameters have the same values across all of the times in the dataset.

In another embodiment, the values of the weight parameters vary based on time or other factors. In one embodiment, the learning module 318 uses 24 different values for each parameter, one for each hour of the day. The learning module 318 uses the same learning technique described above, except that the module solves for the parameters at each hour of the day, producing 24 different values for each parameter. Using multiple parameter values can enhance the accuracy of the MRF model. For example, the weight of the temporal smoothness prior can change such that temporal smoothness has greater weight at times when the population density is unlikely to significantly change, e.g., between 2-3:00 AM, and lesser weight at times when the population density is likely to significantly change, e.g., between 4-5:00 PM.

In one embodiment, the weight of the spatial smoothness prior varies depending upon the location of the nodes being operated upon. Varying the spatial smoothness prior weight allows for incorporation of knowledge regarding the locations of the nodes. For example, a spatial smoothness prior having a relatively large weight can be used with nodes representing adjacent areas that typically have similar population densities, while a spatial smoothness prior having a relatively small weight can be used with nodes representing adjacent areas that typically have different population densities.

An estimate generation module 320 generates an estimate of the current number of mobile devices 112 being used within the areas represented by the nodes of the MRF model. In one embodiment, the estimate generation module 320 uses the values of the weight parameters learned by the learning module 318 in combination with the historical 312 and current 314 datasets to solve for the state variables x in the MRF model. For this usage, the historical data can be the aggregation of data received in a predetermined time interval, such as a year, scaled so that the mean over the dataset approximately matches the mean of one week's worth of data.

Recall that $x_i$ represents an unobservable variable for a node i, i.e., the current number of mobile devices being used within the area represented by that node. In one embodiment, the estimate generation module 320 calculates the state variables x as the mode of the posterior distribution of the MRF model by solving for x as an optimization problem.

To solve for a state variable of a node $x_i$ say node $x_0$, the estimate generation module 320 identifies the values of the related variables in the MRF model. Two variables, $x^1$ and $x^-$, respectively represent node $x_0$'s two neighbors in time. Variable $x^{-1}$ is the value of node $x_0$ in the prior measurement period (e.g., the preceding hour). Variable $x^1$ is the value of node $x_0$ in the subsequent measurement period (e.g., the next hour). As the future value of $x_0$ is not known, one embodiment of the estimate generation module 320 uses a "historical future" value for the node. Thus, if node $x_0$ represents an area at 3:00 PM, the estimate generation module 320 can use the historical value of the area at 4:00 PM as the value for $x^1$. In addition, four variables, $x_{00}$, $x_{01}$, $x_{10}$, and $x_{11}$, respectively represent the node's four neighbors in the space defined by the grid of the MRF model. One variable, $y_0$, represents the current observation of the number of mobile devices being used in the area represented by node $x_0$. Another variable, $\pi_0$, represents the historical value for node $x_0$.

The estimate generation module 320 uses these values in the MRF model, as represented by equations (1)-(4) described above, and optimizes by solving for the values of $x_i$ that minimize cost, i.e., minimize the sum of $\psi$, $\Phi$, $\Omega$, and T. As described by the equations, the more $x_i$ varies from its historic value, its currently observed values, the values of its neighbors in space, and the values of its neighbors in time, the greater the cost. Minimizing cost based on $x_i$ thus produces values for $x_i$ that optimally conform to the model given the weights learned by the learning module 318. After optimization, the value of a given state variable for a node, e.g., $x_0$, represents the estimate of the current number of mobile devices 112 being used within the area represented by that node.

In one embodiment, the estimate generation module 320 uses the conjugate gradient (CG) algorithm to minimize the cost. This algorithm simultaneously solves for $x_i$ in all four equations, for all nodes. In the MRF model, nodes are influenced by adjacent nodes and, thus, each node is dependent on every other node. For an initial node, the adjacent nodes are given a predetermined value (e.g., 0). The nodes quickly converge to their "real" values as the optimization is performed.

A density prediction module 322 uses the estimates of numbers of mobile devices being used within given areas produced by the estimate generation module 320 to predict the population densities of the areas. In general, the density prediction module 322 predicts the population density as a function of the number of mobile devices being used. For example, the density prediction module 322 can multiply the estimated number of mobile devices being used in an area by scale factor that accounts for people in the area that are not using and/or carrying mobile devices, in order to calculate an estimate of total people within the area. The scale factor can vary in different areas. For example, the density prediction module 322 can use different scale factors for areas known to contain primarily pedestrian traffic and areas known to contain primarily vehicular traffic. Similarly, the scale factor can vary over time.

Overview of Methodology

Figure 4:
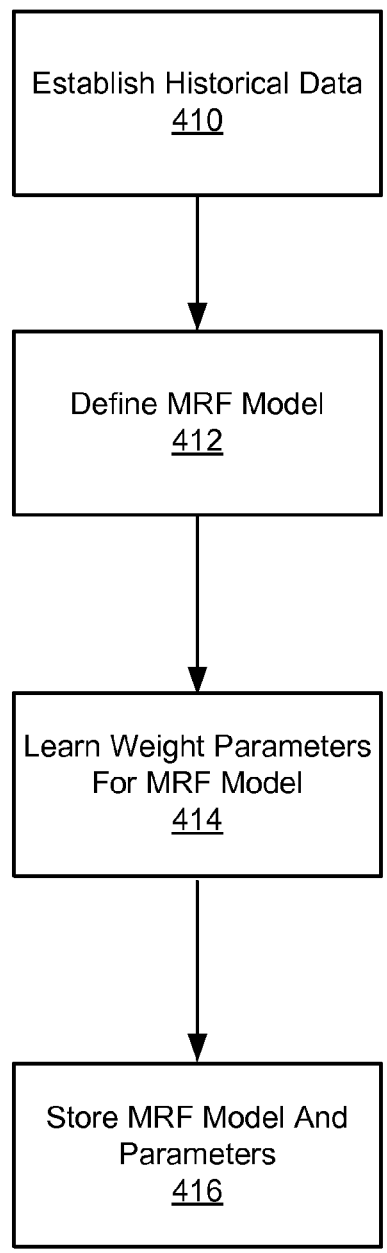
FIG. 4 is a flowchart illustrating a method of learning the values of the weight parameters for the MRF model according to one embodiment.

FIG. 4 is a flowchart illustrating a method of learning the values of the weight parameters for the MRF model according to one embodiment. In one embodiment, the method of FIG. 4 is performed by the density module 118, although some or all of the method can be performed by other modules in other embodiments. In addition, other embodiments can perform the steps of the method in different orders and can include different and/or additional steps.

The density module 118 establishes 410 a historical dataset 312. The historical data describe data points received from mobile devices 112 observed within a defined historical time interval. For example, the historical dataset 312 can describe the data points observed in a prior year. The density module 118 also defines 412 a MRF model. For example, the MRF model can be defined by a human operator who provides computer program instructions that implement the MRF model. In one embodiment, the MRF model has state variables x, observations y, and prior (historical) measurements π, and is represented by equations (1)-(4) described above. The MRF model can be visualized as having the state variables x arranged as nodes in a regular 3-D lattice.

The MRF model has parameters representing weights that the equations have in the overall model. The density module 118 learns 414 the values of the weight parameters by analyzing the historical dataset 312. The density module 118 selects two sets of historical data from the dataset 312, treats one set as test observations, treats the other set as training observations, and computes the unobserved variables using the data. The density module 118 performs optimizations on the weight parameters to learn values that minimize RMSE between the estimates produced by the MRF model using the training data as the current observations and the test data. The density module 118 stores 416 the learned weight parameter values and data describing the MRF model in, e.g., the storage module 310.

Figure 5:
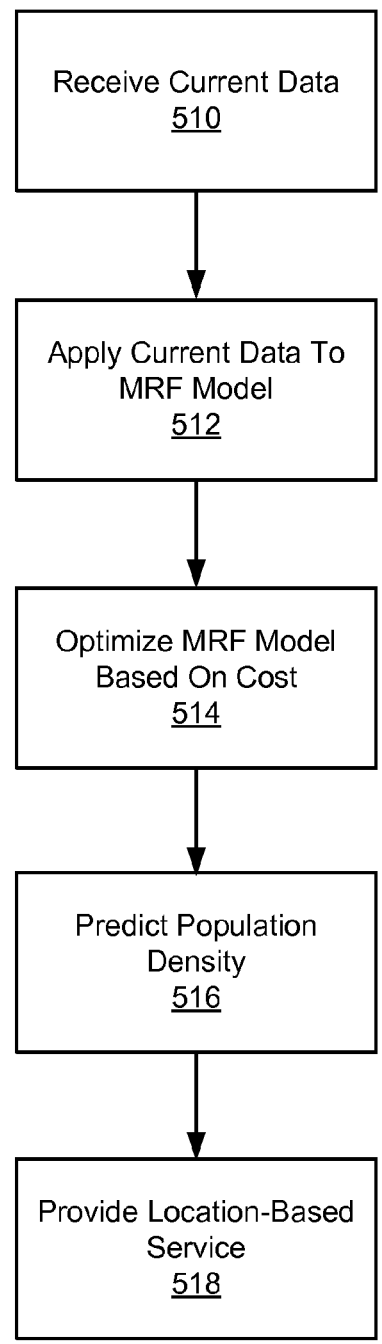
FIG. 5 is a flowchart illustrating a method of predicted population density for a geographic area and providing a location-based service according to one embodiment.

FIG. 5 is a flowchart illustrating a method of predicted population density for a geographic area and providing a location-based service according to one embodiment. In one embodiment, the method of FIG. 5 is performed by the service provider 110, although some or all of the method can be performed by other entities in other embodiments. In addition, other embodiments can perform the steps of the method in different orders and can include different and/or additional steps.

The service provider 110 receives 510 current data describing data points observed from mobile devices 112 in geographic areas in a current interval, such as a current hour. The service provider 110 applies 512 the current data to the MRF model having the learned weight parameter values, and optimizes 514 the model to minimize cost. The optimization produces values for the state variables x representing the estimated number of mobile devices being used within the areas represented by the nodes associated with the state variables. The service provider 110 uses the values of the state variables to predict 516 the population densities within the areas represented by the nodes. The service provider 110 uses the predicted population densities to provide 518 location-based services, such as providing map overlays that graphically illustrate population density and/or traffic congestion.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of predicting geographic population density, comprising:
defining a Markov Random Field (MRF) model for estimating a number of mobile devices used within a geographic area, wherein the MRF model represents a plurality of state variables $x_i$ as nodes in a regular 3-D lattice, wherein nodes in a plane of the lattice describe a plurality of corresponding geographic areas arranged in a grid, values of $x_i$ at the nodes in the plane indicate estimated numbers of mobile devices being used within the corresponding geographic areas at a time slice, and a third dimension of the lattice has nodes indicating values of $x_i$ at time slices preceding and following the time slice of the plane;
applying current data describing a number of mobile devices currently observed within the geographic area and historical data describing a number of mobile devices historically observed within the geographic area to the MRF model to produce an estimate of a number of mobile devices currently being used within the geographic area;
predicting using a processor a population density for the geographic area responsive to the estimated number of mobile devices currently being used within the geographic area; and
storing the predicted population density for the geographic area in a computer-readable storage medium.

2. The method of claim 1, wherein defining the MRF model comprises:
establishing a set of rules describing how to use the current data and the historical data to produce the estimate of the number of mobile devices currently being used within the geographic area, the rules comprising one or more of:
a rule describing a relationship between the estimated number of mobile devices currently being used within the geographic area and the number of mobile devices historically observed within the geographic area;
a rule describing a relationship between the estimated number of mobile devices currently being used within the geographic area and the current data describing the number of mobile devices currently observed within the geographic area;
a rule describing a relationship between the estimated number of mobile devices currently being used within the geographic area and estimated numbers of mobile devices observed within neighboring geographic areas; and a rule describing a relationship between the estimated number of mobile devices currently being used within the geographic area in a current time interval and estimated numbers of mobile devices observed within the geographic area in neighboring time intervals.

3. The method of claim 1, further comprising:

learning values of weight parameters for the MRF model, the learning based at least in part on the historical data describing a number of mobile devices historically observed within the geographic area.

4. The method of claim 3, wherein the MRF model comprises a set of rules describing how to produce the estimate of the number of mobile devices currently being used within the geographic area, and wherein learning the values of the weight parameters comprises:

selecting test data from the historical data;
selecting training data from the historical data;
establishing costs for the rules in the set; and
learning values of the weight parameters for the rules based at least in part on minimizing the costs for the rules in the set using the test and training data.

5. The method of claim 1, wherein the MRF model comprises a set of rules describing how to use the current data and the historical data to produce estimates of numbers of mobile devices currently being used within geographic areas i, wherein the applying comprises:

establishing costs for the rules in the set, the costs dependent at least in part on values of $x_i$, current data for the geographic areas i, and historical data for the geographic areas i; and
minimizing the costs for the rules in the set by varying values of $x_i$;
wherein values of $x_i$ that minimize the costs for the rules indicate the estimates of the numbers of mobile devices currently being used within the geographic areas i.

6. The method of claim 5, wherein minimizing the costs comprises minimizing a sum of the costs for the rules in the set.

7. The method of claim 5, wherein minimizing the costs comprises using conjugate gradient optimization to determine values of $x_i$ that minimize the costs.

8. The method of claim 1, wherein predicting the population density for the geographic area comprises:

predicting the population density of the geographic area as a function of the estimated number of mobile devices currently being used within the geographic area.

9. The method of claim 1, further comprising:

providing a location-based service to a mobile device user, the location-based service using the predicted population density.

10. The method of claim 1, wherein the estimated number of mobile devices currently being used within the geographic area indicates an estimate of a number of mobile devices currently being used to obtain location-based services in the geographic area.

11. A computer for predicting geographic population density, comprising:

a non-transitory computer-readable storage medium storing executable computer program instructions comprising instructions for:
defining a Markov Random Field (MRF) model for estimating a number of mobile devices used within a geographic area, wherein the MRF model represents a plurality of state variables $x_i$ as nodes in a regular 3-D lattice, wherein nodes in a plane of the lattice describe a plurality of corresponding geographic areas arranged in a grid, values of $x_i$ at the nodes in the plane indicate estimated numbers of mobile devices being used within the corresponding geographic areas at a time slice, and a third dimension of the lattice has nodes indicating values of $x_i$ at time slices preceding and following the time slice of the plane;

applying current data describing a number of mobile devices currently observed within the geographic area and historical data describing a number of mobile devices historically observed within the geographic area to the MRF model to produce an estimate of a number of mobile devices currently being used within the geographic area; and predicting a population density for the geographic area responsive to the estimated number of mobile devices currently being used within the geographic area; and a processor for executing the computer program instructions.

12. The computer of claim 11, wherein defining the MRF model comprises:

establishing a set of rules describing how to use the current data and the historical data to produce the estimate of the number of mobile devices currently being used within the geographic area, the rules comprising one or more of:

a rule describing a relationship between the estimated number of mobile devices currently being used within the geographic area and the number of mobile devices historically observed within the geographic area;
a rule describing a relationship between the estimated number of mobile devices currently being used within the geographic area and the current data describing the number of mobile devices currently observed within the geographic area;
a rule describing a relationship between the estimated number of mobile devices currently being used within the geographic area and estimated numbers of mobile devices observed within neighboring geographic areas; and
a rule describing a relationship between the estimated number of mobile devices currently being used within the geographic area in a current time interval and estimated numbers of mobile devices observed within the geographic area in neighboring time intervals.

13. The computer of claim 11, wherein the computer-readable storage medium further comprises instructions for:

learning values of weight parameters for the MRF model, the learning based at least in part on the historical data describing a number of mobile devices historically observed within the geographic area.

14. The computer of claim 13, wherein the MRF model comprises a set of rules describing how to produce the estimate of the number of mobile devices currently being used within the geographic area, and wherein learning the values of the weight parameters comprises:

selecting test data from the historical data;
selecting training data from the historical data;
establishing costs for the rules in the set; and
learning values of the weight parameters for the rules based at least in part on minimizing the costs for the rules in the set using the test and training data.

15. The computer of claim 11, wherein the MRF model comprises a set of rules describing how to use the current data and the historical data to produce estimates of numbers of mobile devices currently being used within geographic areas i, wherein the applying comprises:

establishing costs for the rules in the set, the costs dependent at least in part on values of $x_i$, current data for the geographic areas i, and historical data for the geographic areas i; and minimizing the costs for the rules in the set by varying values of $x_i$;

wherein values of $x_i$ that minimize the costs for the rules indicate the estimates of the numbers of mobile devices currently being used within the geographic areas i.

16. A non-transitory computer-readable storage medium storing executable computer program instructions for predicting geographic population density, the instructions comprising instructions for:

defining a Markov Random Field (MRF) model for estimating a number of mobile devices used within a geographic area, wherein the MRF model represents a plurality of state variables $x_i$ as nodes in a regular 3-D lattice, wherein nodes in a plane of the lattice describe a plurality of corresponding geographic areas arranged in a grid, values of $x_i$ at the nodes in the plane indicate estimated numbers of mobile devices being used within the corresponding geographic areas at a time slice, and a third dimension of the lattice has nodes indicating values of $x_i$ at time slices preceding and following the time slice of the plane;

applying current data describing a number of mobile devices currently observed within the geographic area and historical data describing a number of mobile devices historically observed within the geographic area to the MRF model to produce an estimate of a number of mobile devices currently being used within the geographic area; and predicting a population density for the geographic area responsive to the estimated number of mobile devices currently being used within the geographic area.

17. The non-transitory computer-readable storage medium of claim 16, wherein defining the MRF model comprises:

establishing a set of rules describing how to use the current data and the historical data to produce the estimate of the number of mobile devices currently being used within the geographic area, the rules comprising one or more of:

a rule describing a relationship between the estimated number of mobile devices currently being used within the geographic area and the number of mobile devices historically observed within the geographic area;

a rule describing a relationship between the estimated number of mobile devices currently being used within the geographic area and the current data describing the number of mobile devices currently observed within the geographic area;

a rule describing a relationship between the estimated number of mobile devices currently being used within the geographic area and estimated numbers of mobile devices observed within neighboring geographic areas; and a rule describing a relationship between the estimated number of mobile devices currently being used within the geographic area in a current time interval and estimated numbers of mobile devices observed within the geographic area in neighboring time intervals.

18. The non-transitory computer-readable storage medium of claim 16, further comprising instructions for:

learning values of weight parameters for the MRF model, the learning based at least in part on the historical data describing a number of mobile devices historically observed within the geographic area.

19. The non-transitory computer-readable storage medium of claim 18, wherein the MRF model comprises a set of rules describing how to produce the estimate of the number of mobile devices currently being used within the geographic area, and wherein learning the values of the weight parameters comprises:

selecting test data from the historical data;
selecting training data from the historical data;
establishing costs for the rules in the set; and
learning values of the weight parameters for the rules based at least in part on minimizing the costs for the rules in the set using the test and training learning data.

20. The non-transitory computer-readable storage medium of claim 16, wherein the MRF model comprises a set of rules describing how to use the current data and the historical data to produce estimates of numbers of mobile devices currently being used within geographic areas i, wherein the applying comprises:

establishing costs for the rules in the set, the costs dependent at least in part on values of $x_i$, current data for the geographic areas i, and historical data for the geographic areas i; and minimizing the costs for the rules in the set by varying values of $x_i$;

wherein values of $x_i$ that minimize the costs for the rules indicate the estimates of the numbers of mobile devices currently being used within the geographic areas i.

* * * * *

UNITED STATES PATENT AND TRADEMARK OFFICE
CERTIFICATE OF CORRECTION

| | | |
|---|---|---|
| PATENT NO. | : 8,478,289 B1 | Page 1 of 1 |
| APPLICATION NO. | : 12/791368 | |
| DATED | : July 2, 2013 | |
| INVENTOR(S) | : Lookingbill et al. | |

It is certified that error appears in the above-identified patent and that said Letters Patent is hereby corrected as shown below:

In the Claims

Column 10, line 44, Claim 1, delete "predicting using a processor" and insert --predicting, using a processor,--.

Signed and Sealed this
Seventh Day of January, 2014

Margaret A. Focarino
*Commissioner for Patents of the United States Patent and Trademark Office*